UNITED STATES PATENT OFFICE.

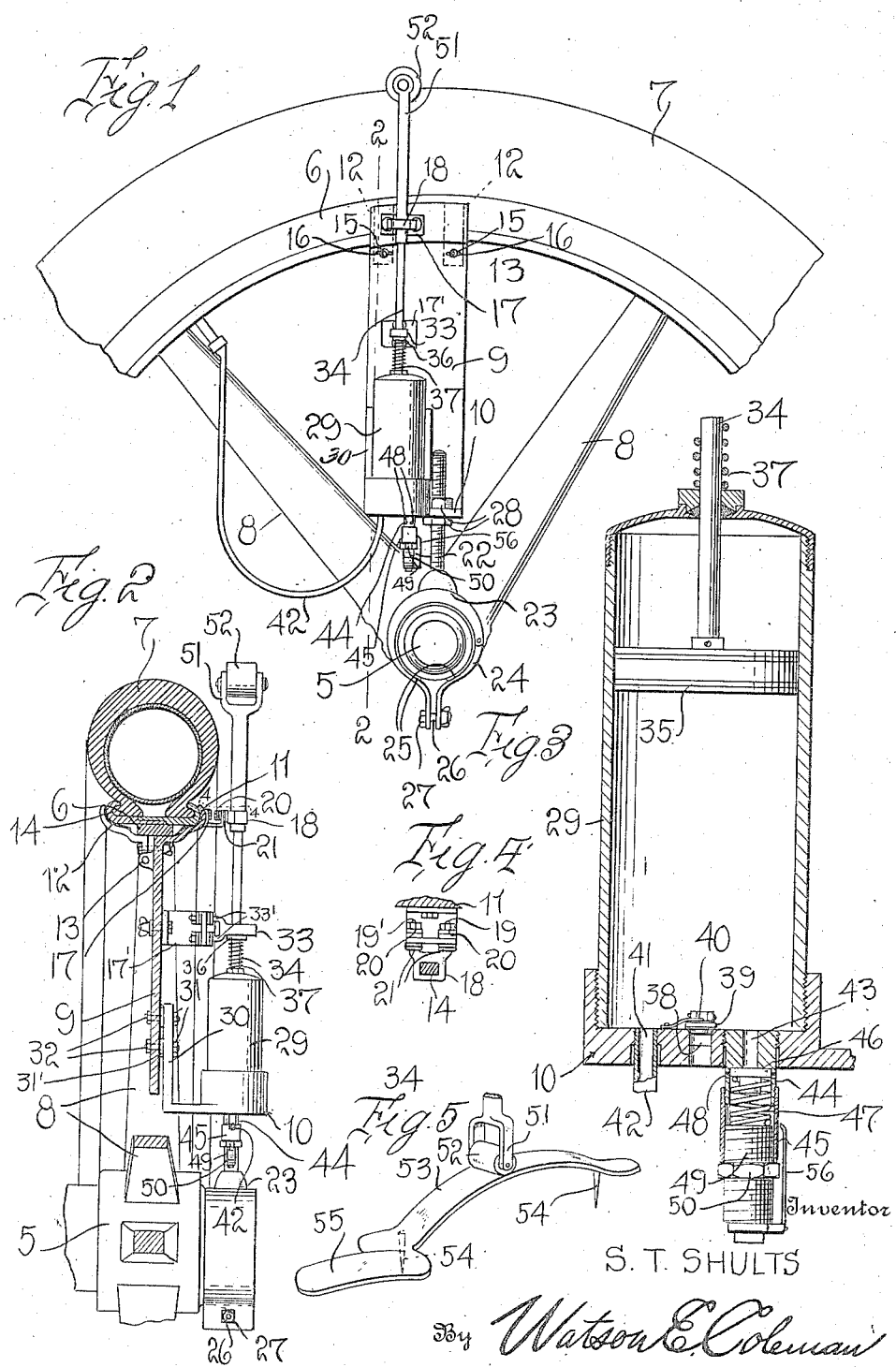

SHERMAN T. SHULTS, OF McCAMMON, IDAHO.

AUTOMATIC TIRE-INFLATING DEVICE FOR VEHICLE-WHEELS.

1,228,610. Specification of Letters Patent. Patented June 5, 1917.

Application filed October 18, 1916. Serial No. 126,354.

*To all whom it may concern:*

Be it known that I, SHERMAN T. SHULTS, a citizen of the United States, residing at McCammon, in the county of Bannock and State of Idaho, have invented certain new and useful Improvements in Automatic Tire-Inflating Devices for Vehicle-Wheels, of which the following is a specification, reference being had to the accompanying drawings.

This invention relates to an improved automatic tire inflating device for vehicle wheels and has for its primary object to provide a very simple and positively operating mechanism mounted upon the motor vehicle wheel, whereby the inner tube of the pneumatic tire may be kept inflated to a predetermined pressure in the travel of the machine.

It is another object of my invention to provide a device of the above character which may also be used for inflating the tire while the machine is stationary, by jacking up the rear wheels and then operating the engine to rotate the wheel.

It is a further general object of my invention to provide a tire inflating device of the above character which may be readily applied to the ordinary motor vehicle wheel without necessitating any alterations or changes therein and which can also be produced at relatively small manufacturing cost and is highly convenient and serviceable in practical use.

With the above and other objects in view, my invention consists in the novel features of construction, combination and arrangement of parts to be hereinafter more fully described, claimed and illustrated in the accompanying drawing, in which, Figure 1 is a side elevation of a motor vehicle wheel, showing my improved tire inflating device applied thereto;

Fig. 2 is a vertical section taken on the line 2—2 of Fig. 1;

Fig. 3 is an enlarged vertical section through the pump cylinder; and

Fig. 4 is a horizontal section taken on the line 4—4 of Fig. 2.

Referring in detail to the drawing, 5 designates the hub of a motor vehicle wheel, 6 the rim or felly thereof, and 7 the pneumatic tire which is mounted or arranged upon the wheel felly in any approved manner. The felly and hub of the wheel are connected by the usual radially extending spokes 8.

9 designates a frame plate which is provided upon one of its ends with an angularly projecting, horizontally disposed base 10. The other or outer end of this frame plate is adapted for engagement against one side of the wheel felly and has a felt or leather pad 11 suitably secured thereto to prevent marring of the finish of the wheel felly. Spaced clamping members 12 are hingedly mounted, as at 13, upon the outer end of the plate 9 and are likewise provided with felt or leather pads 14 for engagement against the opposite side face of the wheel felly. These clamping plates carry bolts 15 to project through openings in the plate 9. Suitable wing nuts 16 are threaded upon the bolts 15, whereby the clamping plates may be drawn into tight clamping engagement upon the side of the wheel felly. A guide loop 18 is formed with spaced, threaded shanks 19 for engagement through spaced openings in the upwardly projecting, free end of the bracket member 17. This guide loop has a rectangular bore or opening for a purpose to be later set forth. An adjustable lock nut 20 is threaded upon the end of each shank 19 and one or more washers 21 are adapted to be engaged upon the shanks between the end of the bracket 17 and the guide 18.

The base flange 10 on the inner end of the plate 9 is provided with an opening through which a threaded bolt 22 is loosely disposed. One end of this bolt is rigidly fixed to the section 23 of a hub clamp. A relatively short clamp section 24 is hingedly connected to one end of the section 23. These clamp sections are adapted to embrace the wheel hub and are provided upon their inner faces with felt or leather pads 25 to prevent chafing or marring of the hub finish. The other ends of the clamp sections are connected by a bolt 26 having adjustable lock nuts 27 threaded thereon whereby the two sections 23 and 24 are held in tight clamping engagement upon the wheel hub. Adjustable lock nuts indicated at 28 are also threaded upon the bolt 22 above and below the flange 10, so as to effectually prevent longitudinal shifting movement of the bolt through said flange. In the manner above described, it will be seen that the frame plate 9 is rigidly held in place upon the wheel between the hub and the rim thereof.

The base 10 is provided with a threaded seat or socket to receive the exteriorly threaded lower end of the pump cylinder 29. The horizontally disposed base 10 is formed with a suitable standard 30. Spaced bolts 31 are disposed through this standard and through openings in the frame plate and have suitable lock nuts 32 threaded upon their ends, thereby securely holding the pump cylinder upon said frame plate. A second bracket member 17' is secured to the plate 9, below and in spaced relation to the bracket member 17, said bracket member 17' being preferably arranged in a plane at right angles to the bracket 17. A guide member 33 is also provided with spaced, threaded shanks 33' for engagement in openings formed in the end of the bracket 17' and adapted to receive suitable clamping nuts. Through the guide members 18 and 33, the piston rod 34 of the pump extends, said rod having a rectangular portion disposed through the guide member 18, whereby turning movement of the piston rod is effectually prevented. The rod 34 extends through a suitable stuffing box in the outer end wall of the pump cylinder 29 and is provided on its inner end with a suitable piston 35 to reciprocate in said cylinder. A collar 36 is engaged upon the piston rod between the guide 33 and the end of the cylinder 29, and is adapted to be adjusted on the piston rod and fixed in its adjusted position by means of a suitable set screw. Between this collar and the end of the cylinder 29, a coil spring 37 is arranged upon the piston rod 34 and normally acts to force the same outwardly, such outward movement being limited by the collar 36 engaging the guide 33. By the adjustment of this collar, it will thus be seen that the stroke of the piston can be regulated as desired.

The base plate 10 is provided with an air inlet opening 38 normally closed by a flap valve 39 which is yieldably held in its closed position by a leaf spring 40, said valve and spring being suitably secured to the base plate 10 at one side of the opening or port 38. An eduction or outlet port 41 is also provided in the base plate, to which the flexible hose or tube 42 is connected at one of its ends, the other end of said tube being equipped with suitable means for connection to a tire valve stem.

The nipple 44 is threaded in the base plate 10 and is provided with an air escape port 43. To this nipple, one end of a tube 45 has threaded connection. A valve member 46 is mounted in this tube and is yieldingly held within the nipple 44 by means of a coil spring 47, whereby the escape port 43 is normally closed. The wall of the nipple 44 is also provided with a series of transverse air outlet openings 48. A tension regulating plug 49 is threaded in the outer end of the tube 45 and bears against the end of the spring 47. By the adjustment of this plug, it will be understood that the tension of the spring 47 can be properly regulated so that a greater or less pressure of air against the inner end of the plug 46 will be required in order to unseat said plug so that the air may escape through the openings 48. The outer end of the plug 49 is preferably square for the application of a suitable wrench thereto, and a lock nut indicated at 50 is threaded upon this plug for bearing engagement against the end of the tube 45, whereby the plug is retained in its adjusted position. The sleeve 45 is provided upon its periphery with annular, spaced graduation scores indicative of the air pressure which may be maintained in the tire and in accordance with which the tension of the spring 47 is adjusted. To this end, an indicator arm 56 is suitably fixed to the outer end of the plug 49 and extends longitudinally over the sleeve 45, the end of said arm being inwardly curved and disposed contiguous to the graduations on the plate. This arm moves with the plug 49 as the latter is turned to compress the spring 47. By the provision of this indicator, it will be seen that the tension of the spring can be readily adjusted to sustain a predetermined air pressure.

The outer end of the piston rod 34 is formed with spaced arms 51, between which a roller 52 is mounted, said roller having its axis disposed transversely with respect to the wheel tire. Normally, or when the piston is at the limit of its outward movement, this roller 52 is disposed a slight distance beyond the periphery of the tire 7.

From the foregoing description, taken in connection with the accompanying drawing, the manner of operation of the device will be fully understood. In the travel of the machine, in each revolution of the wheel the roller 52 will engage the ground surface and the piston 35 will be forced inwardly in the cylinder 29 against the action of the spring 37. The air will thus be forced from said cylinder through the pipe or tube 42 into the tire tube. In the reverse or outward movement of the piston 35, air is sucked or drawn into the cylinder through the port 38. The tension of the spring 47 having been properly adjusted in accordance with the desired maximum air pressure in the tire tube, when such maximum pressure is attained no more air will be pumped into the tire, but upon each inward stroke of the piston 35 the air will be forced from the cylinder 29 through the port 43 and against the valve 46, said valve being unseated against the action of the spring 47 and the surplus air thus escaping to the atmosphere through the openings 48. Whenever the air pressure in the tire tube decreases below this maximum point either from punctures or other causes, the air will again be immediately supplied to the tube so that the tire tube will be kept in an inflated condition until the machine is brought to a stop.

In order to apply the device to tires of various diameters, it will be understood that a series of washers are adapted to be disposed upon each of the shanks 33' of the guide 33, and washers 31' may also be engaged upon the bolts 31.

For the purpose of inflating the tire while the machine is at a standstill, I provide a ground plate 53 having spaced anchoring spurs or lugs 54 adapted to be forced into the ground, and also provided upon one end with an extension 55 which serves as a foot plate upon which the foot may be engaged to more securely hold the plate 53 in place. The rear wheels of the machine are first jacked up or raised above the ground surface and the engine then set in operation. In each revolution of the wheel, the roller 52 on the outer end of the piston rod will engage the plate 53 so as to force said rod inwardly and thus actuate the pump piston 35. In this manner, it will be seen that the pneumatic tires of vehicle wheels may be easily and quickly inflated either while the machine is in operation or at a standstill.

The device above described consists of relatively few parts which are all of simple form and can, therefore, be produced at relatively small manufacturing cost. The mechanism is not liable to get out of order but is highly positive and reliable in operation.

While I have shown and described the preferred construction and arrangement of the several elements employed, it is, of course, to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. The combination with a vehicle wheel having a pneumatic tire, of a plate adapted to be arranged within adjacent wheel spokes and having a flange on one end to engage one side of the wheel rim, rim clamping means mounted upon the opposite side of the plate, a laterally adjustable support mounted upon the inner end of said plate, an air pump arranged upon said support, a connection between the pump chamber and the tire valve, said pump including a reciprocatory piston, and means operatively connected to the piston engageable with the ground surface in each revolution of the wheel.

2. The combination with a vehicle wheel having a pneumatic tire, of a plate radially disposed between the rim and hub of the wheel, means on one end of the plate for clamping the same to the wheel rim, laterally adjustable guide members mounted upon said plate, a laterally adjustable pump support mounted upon the inner end of the plate, a hub clamp, means adjustably connecting the hub clamp to the pump support, a pump arranged upon said support and including a piston, a connection between the pump chamber and tire valve, and a rod reciprocating through said guides and connected to the pump piston.

In testimony whereof I hereunto affix my signature in the presence of two witnesses.

SHERMAN T. SHULTS.

Witnesses:
  H. E. RAY,
  EARL E. JACOBS.